Figures 1, 2:
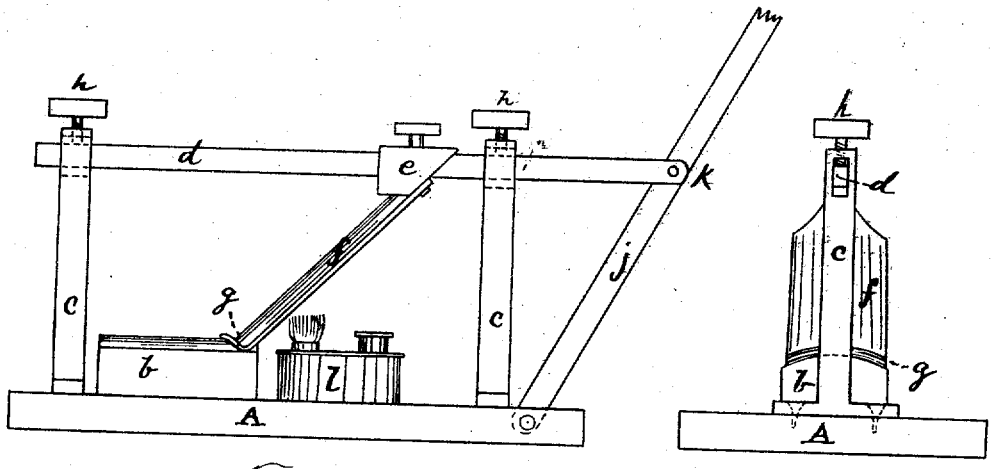

E. R. WESTON.

Improvement in Burnishing Apparatus for Photographs.

No. 5,780. Reissued March 3, 1874.

Witnesses.
J. Ay Richter
J. Colby Jr.

Inventor
Emile R Weston
Per Wm. Franklin Seamy
Atty

AM. PHOTO-LITHOGRAPHIC Co. N.Y. (OSBORNE'S PROCESS.)

UNITED STATES PATENT OFFICE.

EMILE R. WESTON, OF BANGOR, MAINE, ASSIGNOR TO JOSEPH P. BASS.

IMPROVEMENT IN BURNISHING APPARATUS FOR PHOTOGRAPHS.

Specification forming part of Letters Patent No. 131,320, dated September 10, 1872; reissue No. 5,780, dated March 3, 1874; application filed June 21, 1873.

*To all whom it may concern:*

Be it known that I, EMILE R. WESTON, formerly of East Corinth, now of Bangor, in the county of Penobscot and State of Maine, have invented certain new and useful Improvements in Machines for Burnishing Photographs; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 shows a side elevation; Fig. 2, an end view.

Same letters show like parts.

The object of my invention is to produce a machine which shall impart to photographic pictures a hard, polished surface, which adds both to the brilliancy of the picture, and to its durability, being less liable to soil than an ordinary photograph.

I am aware that photographs have been made with polished surfaces; but it has been generally done by varnishes, which are liable to crack and injure the appearance of the picture. My invention acts on a different principle, and polishes the surface of the picture itself, laying the fibers of the paper down, and burnishing them by friction, pressure, and heat, giving to it, when completed, a hard and brilliant burnish finish.

The natural surface of the albumen paper generally employed for photographs is shiny without being smooth. It consists of thousands of little hills and valleys, reflecting the light in every direction. By my machine a close, polished, and ungranulated surface is given to the picture, and that peculiar brilliant transparent effect which a print possesses in the water before it has been dried. This last is due to the action of the heat upon the chemicals, its effect being to tone the picture, and to give a luminous quality to the shadows, bringing out the detail, and correcting the bronze appearance so frequently seen. No amount of cold burnishing will produce this effect.

One of the principal features of my invention is a concave burnishing-tool working upon a convex bed. This form leaves the picture smoothly and evenly attached to the card. The burnisher is applied with pressure, and also heated.

I will now proceed to describe my machine by reference to the drawing.

A shows the bed-piece, to which the apparatus is attached, provided with screws or clamps for attaching to it a bench or table. At *b* is seen the convex bed, of some hard material, upon which the photograph is placed. *c c* are standards, having slots at the top, through which passes a rod or bar, *d*, to which, at *e*, is securely fastened the burnisher *f*, which is composed of metal, similar to the shape shown. This burnisher I prefer to have of cast-iron, with its lower edge *g* (which is turned up, and is concave on its lower side to fit the convex bed *b*) case-hardened or chilled, and highly polished. At *h i* are set-screws, fixed in the top of the standards *c c*, so that, by turning them down, they press upon the rod *d*, and force it and the attached burnisher *f* down upon the bed and picture. *j* shows a lever to operate the burnishing-tool, having its fulcrum in the bed-piece A, and secured to the rod *d* at K. At *l* is a lamp, by which the burnisher *f* is heated.

The operation of burnishing a picture is as follows: The lamp *l* is lighted, and the burnisher *f* is allowed to remain over it till it is sufficiently warm—usually about five minutes will suffice. By means of the screws *h i* it is pressed down close to the convex bed *b*, and the picture inserted between them under the edge of the burnishing-tool, which is drawn over it by means of the lever *j*. The ends of the picture are then reversed, and the operation repeated. Two strokes each way will usually suffice to give a fine burnish polish. The pressure exerted by the screws *h i* assist the operation of burnishing, and the concavity of the tool *f*, together with the convexity of the bed, serves, as it were, to stretch the picture on the card. If their shape were the reverse, or if both were flat, the picture would pucker instead of polishing.

I am aware that it is customary to roll photographic pictures, after mounting them upon their cards, between two rollers. This has the effect of a press, and smooths the print, imparting in the process some slight degree of polish as compared with the unrolled picture. But neither the character, nor the degree of polish, resembles the burnish finish obtained by the use of my machine.

What I claim as my invention, and desire to secure by Letters Patent, is—

1. In a burnisher for photographs, the combination of the concave burnisher *f* and the concave bed *b*, substantially as set forth.

2. In combination with the above, the standards *c c*, rod *d*, and pressure-screws *h i*, substantially as described.

3. In combination with the elements mentioned in the above claims, the lamp *l* and lever *j*, all being arranged and operated substantially as specified, for the purposes set forth.

4. As a new article of manufacture, a hot-burnish-finished photograph, produced by the combined action of heat and a non-rotating burnishing-tool upon the surface of the print.

In testimony that I claim the foregoing I have hereunto set my hand this 30th day of May, 1873.

EMILE R. WESTON.

Witnesses:
WM. FRANKLIN SEAVEY,
J. P. BASS.